No. 621,438. Patented Mar. 21, 1899.
C. VANNESTE.
VEHICLE.
(Application filed Nov. 3, 1898.)
(No Model.) 2 Sheets—Sheet 1.
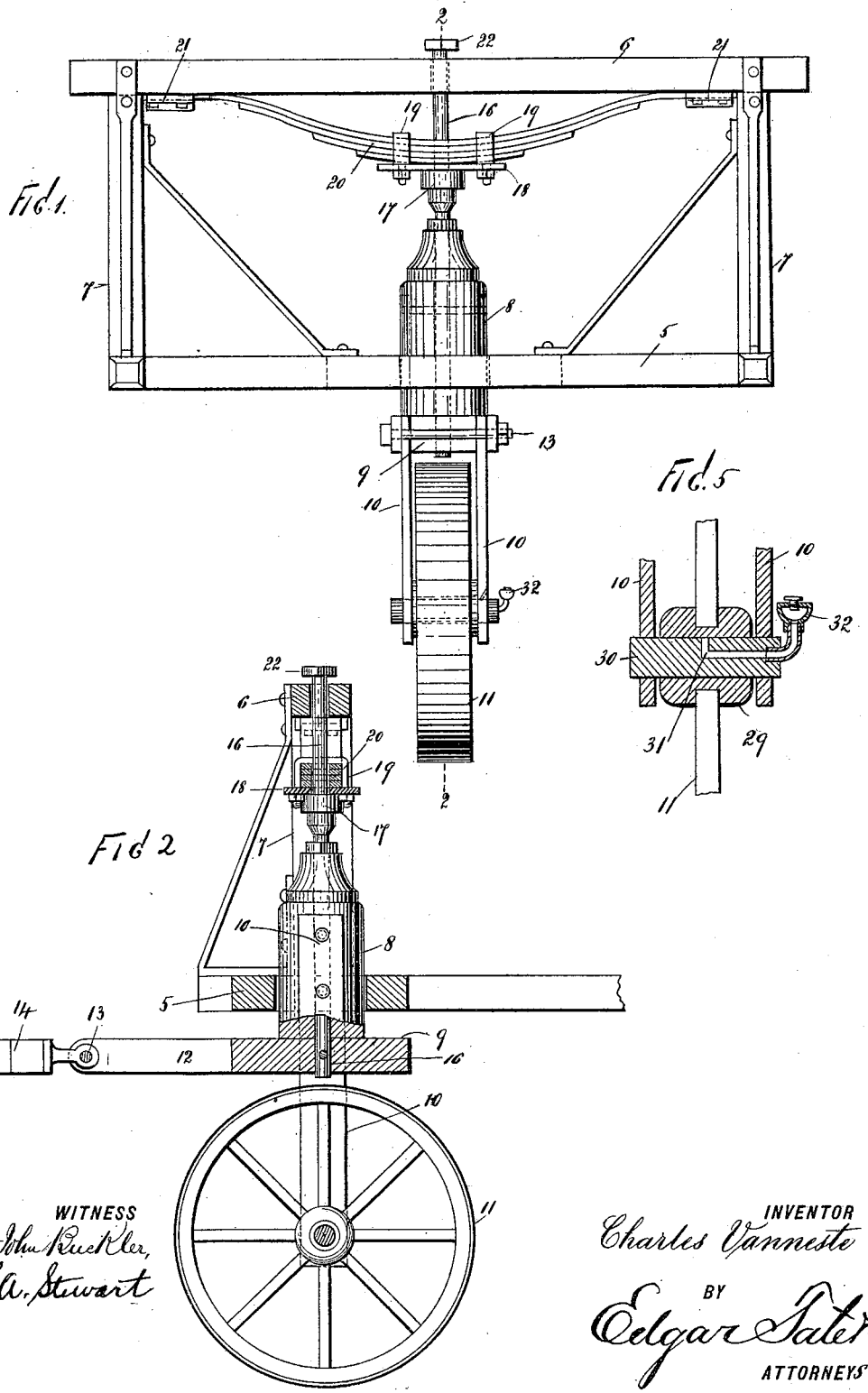
WITNESS
John Buckler,
J. A. Stewart
INVENTOR
Charles Vanneste
BY
Edgar Tate & Co
ATTORNEYS No. 621,438. Patented Mar. 21, 1899.
C. VANNESTE.
VEHICLE.
(Application filed Nov. 3, 1898.)
(No Model.) 2 Sheets—Sheet 2.
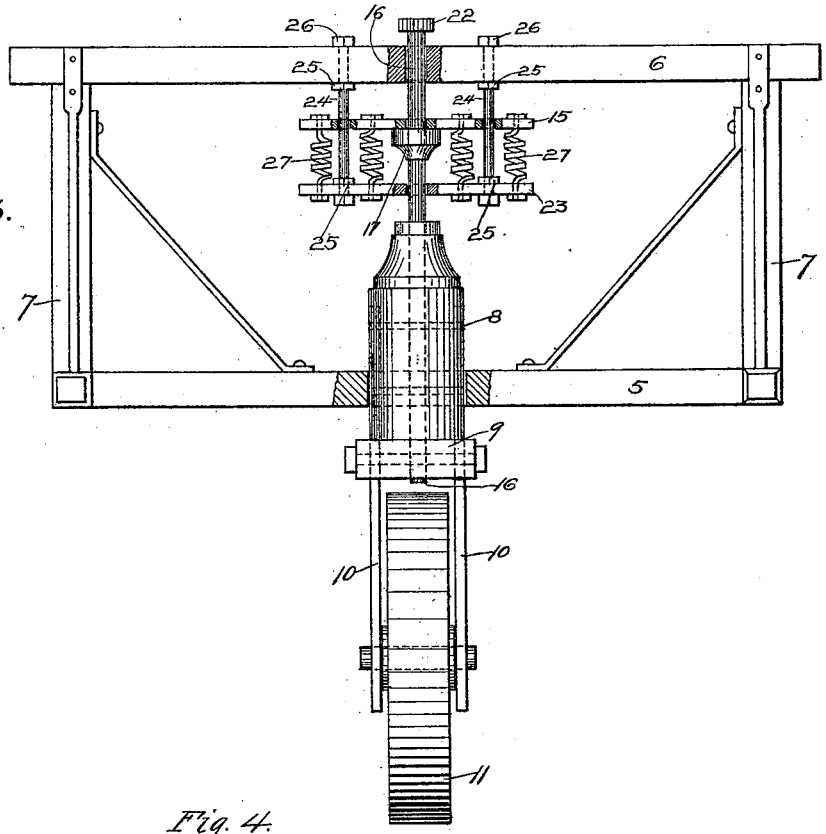
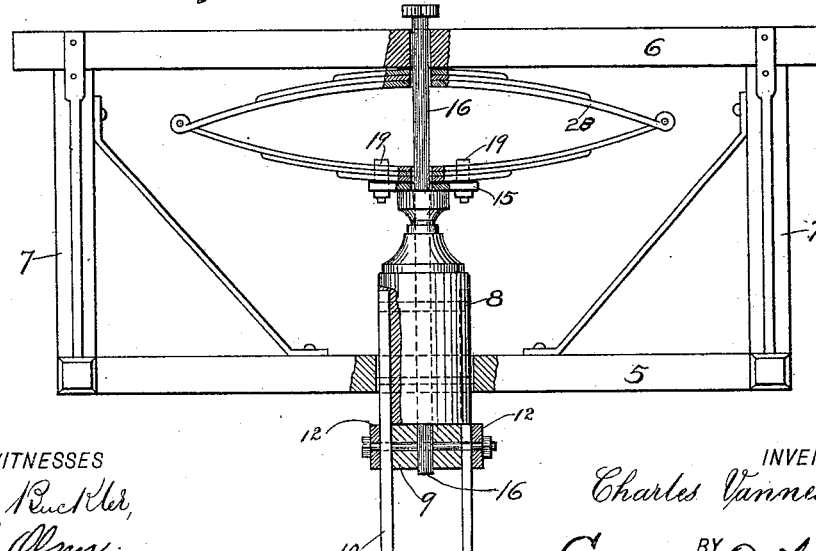
WITNESSES
John Buckler,
C. C. Olsen.
INVENTOR
Charles Vanneste,
BY
Edgar Tate & Co.
ATTORNEYS.
THE NORRIS PETERS CO., PHOTO-LITHO., WASHINGTON, D. C.

UNITED STATES PATENT OFFICE.

CHARLES VANNESTE, OF NEW YORK, N. Y.

VEHICLE.

SPECIFICATION forming part of Letters Patent No. 621,438, dated March 21, 1899.

Application filed November 3, 1898. Serial No. 695,406. (No model.)

*To all whom it may concern:*

Be it known that I, CHARLES VANNESTE, a citizen of Belgium, residing at New York, in the county of New York and State of New York, have invented certain new and useful Improvements in Vehicles, of which the following is a full and complete specification, such as will enable those skilled in the art to which it appertains to make and use the same.
This invention is the same as that for which I have obtained Letters Patent in Belgium, dated April 1, 1898, No. 134,895, and relates to trucks, wagons, and similar vehicles; and the object thereof is to provide a vehicle of this class with a single front wheel, whereby the construction of the vehicle is simplified and cheapened and whereby said vehicle may be easily drawn and more conveniently operated than in the case of vehicles of this class as usually constructed.

The invention is fully disclosed in the following specification, of which the accompanying drawings form a part, in which—

Figure 1 is a front view of the end of a truck made according to my invention; Fig. 2, a partial section on the line 2 2 of Fig. 1. Figs. 3 and 4 are each views similar to Fig. 1, each showing modified forms of construction and part of the construction of each being in section; and Fig. 5, a sectional detail.

In the drawings forming part of this specification the separate parts of my improvement are designated by the same numerals of reference in each of the views, and in the practice of my invention, as shown in Figs. 1 and 2 of the drawings, I provide a front end frame for a truck or vehicle body, composed of a bottom 5, a top 6, and vertical sides 7, which connect the top and bottom, and the separate parts of this frame are securely connected and braced, so as to give the requisite strength thereto. Passing vertically through the center of the bottom 5 of said frame is a short vertical axle 8, provided at its lower end with a cross-head 9 and having countersunk side plates 10, which extend downwardly past said cross-head and are secured thereto. The front wheel 11 of the vehicle is mounted in the lower ends of said side plates, and the cross-head 9 is provided with forwardly-directed side arms 12, which carry a cross-rod 13, with which the pole or shaft 14 of the vehicle is connected. The doubletrees and whiffletrees may also be connected with the cross-head 9 or the arms 12 thereof in any desired manner; but these parts form no part of this invention and are not shown and described.

The vertical axle 8 may be composed of any desired material and may be secured to the cross-head 9 in any desired manner, and passing vertically through the top portion 6 of the frame, in which the axle 8 is mounted, is a short shaft or spindle 16, the lower end of which enters the upper end of the axle 8 and passes downwardly therethrough and is rigidly secured thereto by the bolts which hold the side plates 10, and said shaft or spindle forms an extension of said axle and may be formed integrally therewith, if desired.

The shaft or spindle 16 is provided with an annular collar or head 17, which is rigidly connected therewith or formed integrally therewith, and above said head is a supporting-plate 18, through which said shaft or spindle 16 passes, and mounted on said plate and secured thereto by yokes 19 is a strong plate-spring 20, the ends of which are curved upwardly and outwardly and passed into keepers 21, secured to the bottom of the top portion of the said frame.

The spring 20 is composed of spring leaves or plates which increase in length from the bottom upwardly, and the ends of the upper leaf or plate passes into the keepers 21, as clearly shown in the drawings. Instead of using springs 20, through which the shaft or spindle passes, it will be evident that two such springs may be employed and the shaft or spindle passed between them.

As thus constructed it will be seen that the entire weight of the truck or vehicle body of which the frame, composed of the bottom 5, top 6, and sides 7, forms a part is supported at the front end by the spring 20, which is supported by the wheel 11 and the axle 7, and the bottom portion 5 of said frame in its normal position is, above the head 9, connected with the lower end of the axle 8. This arrangement permits of the vertical movement of said frame in the operation of the vehicle, the axle 8 passing loosely through the bottom 5 of said frame and the shaft or spindle 16 passing loosely through the top 6 of said frame.

With my improvement the entire weight of the vehicle at the front end thereof rests on the wheel 11, as hereinbefore described, and the vehicle may be much more easily turned and operated than vehicles of this class as usually constructed.

Another advantage resulting from my improved construction consists in the fact that the shaft or pole 14 of the vehicle will not be thrown from side to side and strike or injure the horses, as frequently occurs in using vehicles of this class as usually constructed, and the said vehicle will run much more easily and may be turned, backed, and otherwise moved with greater ease and facility than ordinary vehicles of this class.

The shaft or spindle 16 is provided at its upper end with a knob or head which limits the upward movement of the frame, and in the construction shown in Fig. 3 I employ the shaft or spindle 16, with the collar 17 and the supporting-plate 18, and in connection therewith a supplemental supporting-plate 23, loosely mounted on the shaft or spindle below the collar 17, and suspending-rods 24 are passed downwardly through the top bar 6 of the frame and loosely through the plate 18 and through the supplemental plate 23, and said rods are rigidly connected with the top bar 6 of the frame and the bottom supplemental plate 23 by means of nuts placed on said rods above and below said plate and below said bar, as shown at 25, said rods being also provided with heads 26.

The main supporting-plate 18 and the supplemental plate 23 are connected by strong spiral springs 27, which are rigidly secured to said plates in any desired manner. These springs take the place of the spring 20, (shown in Fig. 1,) and any desired number of said springs may be employed, and said springs support the weight of the front of the vehicle bed or body, as will be readily understood, by reason of their connection with the plate 18, from which they are suspended, the lower plate 23 being free to move on the shaft or spindle 16 and being forced downwardly by the rods 24, and the operation of this form of construction is the same as that hereinbefore shown and described.

In the construction shown in Fig. 4 a double or elliptical plate-spring 28 is employed similar in form and construction to springs of this class usually employed in buggies, carriages, and similar vehicles, and this spring 28 rests on the plate 18 and is connected therewith by the yokes 19, and the shaft or spindle 16 passes through the upper side of said spring and is movable therein and in the top portion 6 of the frame. In this form of construction the weight of the front end of the vehicle-body is supported by the spring 28, and the operation of this construction is the same as that hereinbefore described, and shown in Fig. 1, and two of the springs 28 may be employed, if desired.

It will be understood that the frame, consisting of the parts 5, 6, and 7, in practice forms a part of and is connected with the vehicle body or bed, and said vehicle body or bed is supported at its rear end by a truck provided with two wheels; but the vehicle body or bed and the rear truck form no part of this invention and are therefore not shown and described, and it will also be understood that any suitable front frame may be employed and other modifications of the construction herein described may be made without departing from the spirit of my invention or sacrificing its advantages.

The wheel 11 is provided with a hub 29, as shown in Fig. 5, and is mounted on a spindle 30, and said spindle is provided with a longitudinal bore 31 at one end, the outer end of which is turned upwardly and provided with an oil-cup 32, and the inner end of said bore opens laterally through one side of the spindle, and in practice whenever it is desired to oil the spindle all that is necessary is to pour the oil into the oil-cup 32, as will be readily understood.

Having fully described my invention, I claim as new and desire to secure by Letters Patent—

1. A front end frame for a truck or vehicle body, provided with a short central vertical axle which passes through the bottom of said frame and is adapted to turn therein, a wheel-support connected with the lower end of said axle and provided with a wheel which is mounted therein, a shaft or spindle connected with the upper end of said axle and passing through the top of said frame, a spring-support connected with said shaft or spindle and through which said shaft or spindle passes, and a spring or springs mounted in connection with said spring-support and by which the said frame is supported, substantially as shown and described.

2. A front end frame for a vehicle body or bed, comprising a bottom and top rigidly connected, a short vertical axle passing through the bottom of said frame and adapted to turn therein, a wheel-support connected with the lower end of said axle, said axle being provided with a vertical extension or spindle which passes through the top of said frame, a spring-support mounted on said extension or spindle, and a spring or springs mounted between said support and the top of said frame, substantially as shown and described.

3. A vehicle provided with a single front wheel which is connected with the lower end of an axle which passes through and is revoluble in the bottom of a frame forming part of the front end of the vehicle-body, said axle being provided with a vertical spindle or extension which passes through the top of said frame, a support mounted below the top of said frame, and a spring or springs mounted between said support and the top of said frame, substantially as shown and described.

4. A vehicle provided with a single front wheel which is connected with the lower end of an axle which passes through and is revoluble in the bottom of the frame forming part of the front end of the vehicle-body, said axle being provided with a vertical extension which passes through the top of said frame, and with an attachment below the top of said frame, and springs connected with said attachment and supporting said frame, substantially as shown and described.

In testimony that I claim the foregoing as my invention I have signed my name, in presence of the subscribing witnesses, this 29th day of October, 1898.

CHARLES VANNESTE.

Witnesses:
RAYMOND VAN BLAKESLEE,
F. A. STEWART.